No. 891,338. PATENTED JUNE 23, 1908.
J. A. HEMSLEY.
TIRE BOLTING MACHINE.
APPLICATION FILED MAR. 11, 1908.

2 SHEETS—SHEET 1.

Witnesses
Phil E. Barnes
J. J. Sheehy Jr.

Inventor
J. A. Hemsley
By James Sheehy
Attorney

No. 891,338. PATENTED JUNE 23, 1908.
J. A. HEMSLEY.
TIRE BOLTING MACHINE.
APPLICATION FILED MAR. 11, 1908.
2 SHEETS—SHEET 2.
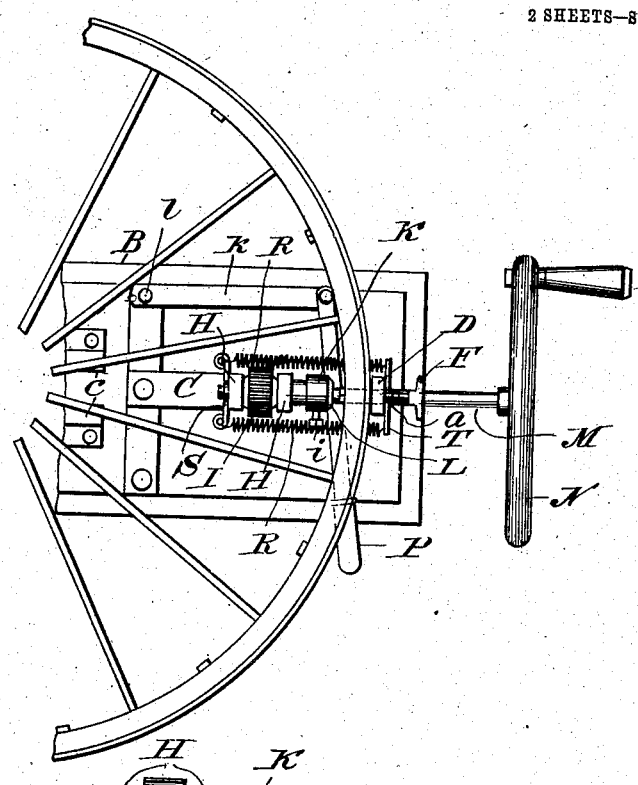
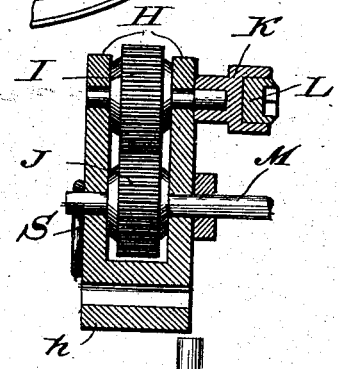
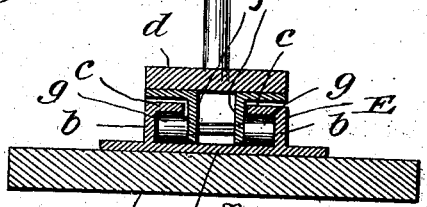

UNITED STATES PATENT OFFICE.

JOSEPH APPLEGATE HEMSLEY, OF TRENTON, NEW JERSEY.

TIRE-BOLTING MACHINE.

No. 891,338.

Specification of Letters Patent.

Patented June 23, 1908.

Application filed March 11, 1908. Serial No. 420,438.

*To all whom it may concern:*

Be it known that I, JOSEPH A. HEMSLEY, citizen of the United States, residing at Trenton, in the county of Mercer and State of New Jersey, have invented new and useful Improvements in Tire-Bolting Machines, of which the following is a specification.

My invention pertains to the fastening of tires to the fellies of wheels; and it has for its object to provide a simple, inexpensive and easily operated machine constructed with a view of facilitating the bolting of tires to wheel fellies.

Figure 1:
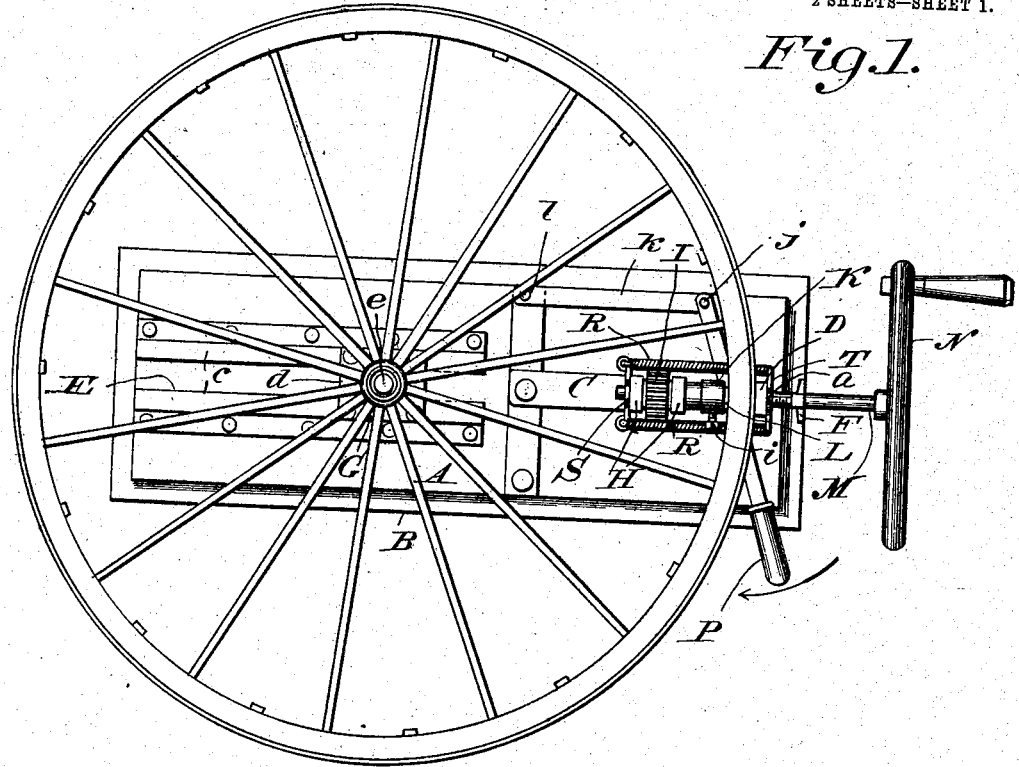
Figure 2:
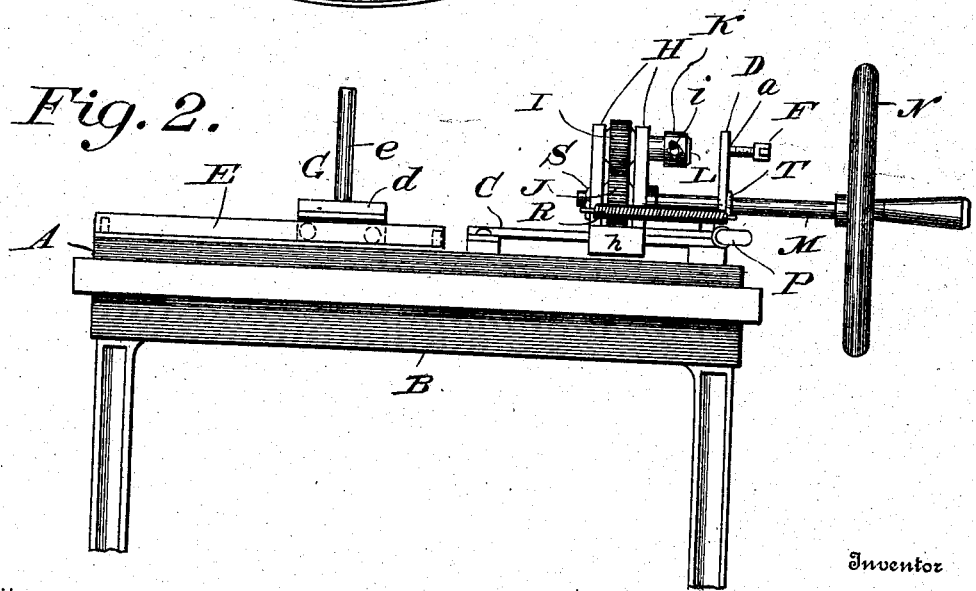

With the foregoing in mind, the nature of the invention and its novelty, utility and practical advantages will be fully understood from the following description and claims when the same are read in connection with the drawings, accompanying and forming part of this specification, in which:

Figure 1 is a plan view illustrating a wheel properly arranged, relative to my novel machine, in order to permit of a nut being expeditiously turned on or off a bolt extending through the tire and felly of the wheel. Fig. 2 is a side elevation of the machine. Fig. 3 is a detail plan view illustrating the parts in position to permit of the interposition of a wheel felly and tire between the fixed standard and the nut wrench of the machine. Fig. 4 is an enlarged, detail, longitudinal section taken through the movable standards, the wrench holder and the nut wrench of the machine. Fig. 5 is an enlarged, detail, transverse section taken through the wheel carriage of the machine and the track therefor and also through the machine base.

Similar letters designate corresponding parts in all of the views of the drawings, referring to which:

A is the base of the machine constituting the best practical embodiment of my invention of which I am cognizant. The said base is designed to be arranged on a table B or any other suitable support; and it is provided on its upper side with a longitudinally disposed guide-bar C which is supported at about the proportional distance shown above its upper surface and terminates at its forward end in a standard D having a longitudinally disposed threaded aperture $a$ for a purpose hereinafter set forth. The base A is further provided with a track E which is fixed to the upper side thereof in rear of the guide-bar C and is provided with upwardly extending side walls $b$ and flanges $c$ reaching inwardly from said side walls, as best shown in Fig. 5.

F is a longitudinally disposed bolt bearing in the threaded aperture $a$ of the fixed standard D. The said bolt F is designed to be set against the heads of tire bolts with a view of preventing turning of said bolts in a wheel tire and felly incidental to the screwing of nuts on or the removal of nuts from the said bolts.

G is the wheel carriage of the machine. The said carriage G comprises a body $d$, a post $e$ fixed to and rising from the said body and designed to extend through the hub of a wheel after the manner illustrated in Fig. 1, one or more portions $f$ fixed to and depending from the body $d$, Fig. 5, and resting between the flanges $c$ of track E, and antifriction rollers $g$, Fig. 5, connected with the said depending portions $f$ and arranged to travel on the lower portion of the track and interposed between said lower portion and the flanges $c$. By reason of this arrangement of the anti-friction rollers $g$, relative to the track, it will be manifest that the flanges $c$ are enabled to effectually prevent material sagging of the wheel at either side of the base A.

H H are standards separated by an intervening space and having their lower ends fixedly connected through the medium of a longitudinally disposed sleeve $h$, Figs. 2 and 4, which receives and is movable longitudinally on the fixed guide-bar C. Between the said standards H are arranged intermeshed spur gears I and J, and, as best shown in Fig. 4, the forward journal of the spur gear I carries a wrench-holder K which is designed to receive different sizes of nut wrenches; the wrench L illustrated being detachably secured in the holder through the medium of a set screw $i$. The spur gear J is keyed or otherwise suitably fixed on a longitudinally disposed shaft M, which shaft M is journaled in the standards H and also in the fixed standard D and is preferably movable endwise with the standards H and through the standard D. At its forward end the shaft M is provided with a crank wheel N, and it will be manifest from the foregoing that when the shaft M is rotated the wrench L in the holder K will also be rotated and at a high rate of speed.

P is a horizontally movable hand lever which is disposed above the fixed guide-bar C and is fulcrumed at $j$ to a horizontally movable link k which, in turn, is fulcrumed at l on the base of the machine. As will be observed by reference to Fig. 1, the hand lever P is arranged between the forward movable standard H and the fixed standard D, and consequently it will be observed that when the lever P is moved in the direction indicated by arrow in Fig. 1 it will bear against the said forward standard H and move the two standards H rearwardly or away from the fixed standard D. This is done to permit of the interposition of the wheel felly and tire between the fixed standard D and the wrench L, and subsequent to the said arrangement of the wheel, two tractile springs R operate to move the standards H forward so that the nut on a bolt extending through the tire and felly is received in the wrench L.

With the parts of the machine arranged as last above stated it will be apparent that the screw F will bear against the outer end of the bolt and hold the bolt against turning in the tire and felly; and it will also be apparent that when the wheel N is turned in the proper direction the nut in the wrench L will be expeditiously turned up on the bolt and this with the expenditure of but a minimum amount of effort. At this point I desire it understood that when a nut is to be turned up on a bolt extending through the tire and felly the nut in the first instance may be placed either on the inner end of the bolt or in the wrench L at the pleasure of the operator. It will be further apparent from the foregoing that my novel machine may be used to advantage for removing nuts from tire bolts precedent to the removal of the bolts from the felly and tire and the removal of the tire from the felly.

I prefer in practice to arrange and connect the springs R in the manner illustrated—that is to say, I prefer to arrange the springs at opposite sides of the path of the movable standards H and to connect the springs at their ends to the ends of transverse yokes S and T straddling the shaft M in rear of the rear standard H and in front of the fixed standard D, respectively, as best shown in Figs. 1, 2 and 3.

The carriage G of my improvements is mounted to be moved toward and from the fixed standard D in order that the machine may be used to operate on wheels of various diameters.

It will be gathered from the foregoing that in the operation of my novel machine nuts may be expeditiously put on the tire bolts of a wheel one after another, and that when it is desired to remove a tire nuts may be as readily removed from the tire bolts.

As before stated, the machine herein illustrated and described constitutes the best practical embodiment of my invention of which I am aware, but it is obvious that in the future practice of the invention such changes or modifications may be made as fairly fall within the scope of my invention as defined in the claims appended.

Having described my invention, what I claim and desire to secure by Letters-Patent, is:

1. In a machine for the purpose described, the combination of a base, means thereon for turning nuts off and on bolts, a track fixed on the base and having side walls and flanges reaching inwardly therefrom, and a carriage movable on the track and toward and from said means and having a post and also having anti-friction devices arranged between the lower portions of the track and the flanges thereof.

2. In a machine for the purpose described, the combination of a base, an abutment on the base for preventing movement of a wheel in one direction, standards connected with and guided on the base and movable toward and from the abutment, a gear mounted between said standards, a wrench connected with said gear and opposed to the abutment, a shaft journaled in the abutment and the standards, a gear mounted to turn with said shaft and intermeshed with the first mentioned gear, a transverse yoke straddling the shaft in rear of the rear standard, a transverse yoke straddling the shaft in front of the abutment, and tractile springs connecting the ends of the said yokes.

In testimony whereof I have hereunto set my hand in presence of two subscribing witnesses.

JOSEPH APPLEGATE HEMSLEY.

Witnesses:
  C. A. WORTHINGTON,
  BENJAMIN H. BUGBEE.